United States Patent [19]

Johnson et al.

[11] Patent Number: 4,736,309

[45] Date of Patent: Apr. 5, 1988

[54] DATA DISPLAY FOR CONCURRENT TASK PROCESSING SYSTEMS

[75] Inventors: Peter W. Johnson; Peter D. Niblett, both of Winchester, United Kingdom

[73] Assignee: International Business Machines Corporation, Armonk, N.Y.

[21] Appl. No.: 759,706

[22] Filed: Jul. 26, 1985

[30] Foreign Application Priority Data

Jul. 31, 1984 [GB] United Kingdom ................ 8419440

[51] Int. Cl.[4] ......................... G06F 3/00; G09G 1/00

[52] U.S. Cl. ................................ 364/521; 340/721; 340/724; 364/900

[58] Field of Search .............. 364/518, 521, 522, 200, 364/900; 340/709, 721, 724, 727

[56] References Cited

U.S. PATENT DOCUMENTS

| | | | |
|---|---|---|---|
| 4,396,989 | 8/1983 | Fleming et al. | 364/521 |
| 4,414,628 | 11/1983 | Ahuja et al. | 364/200 |
| 4,481,594 | 11/1984 | Staggs et al. | 364/521 |
| 4,509,043 | 4/1985 | Mossaides | 340/721 |
| 4,542,376 | 9/1985 | Bass et al. | 340/724 |
| 4,550,315 | 10/1985 | Bass et al. | 364/522 |
| 4,554,538 | 11/1985 | Bieneman | 340/721 X |
| 4,555,775 | 11/1985 | Pike | 364/900 |
| 4,599,610 | 7/1986 | Lacy | 340/721 |
| 4,642,790 | 2/1987 | Minshull et al. | 364/900 |

*Primary Examiner*—Felix D. Gruber

*Attorney, Agent, or Firm*—Robert L. Troike; Frederick D. Poag

[57] ABSTRACT

A method and apparatus for automatically changing the display in overlapping rectangular viewport areas of a display screen of a digital display apparatus and in which each viewport area is assigned a different priority level. The method includes the steps of (a) storing in a random access store indications of the position and size of each viewport area, together with an indication of the priority level of the viewport area and (b) constructing a first matrix of $(2n+1)^2$ elements, where n is equal to the number of viewport areas, by assigning a vertical component to each vertical coordinate of each viewport area and a horizontal component to each horizontal coordinate of each viewport area, and for each element so formed storing an indication of the highest priority level of the viewports falling within the boundary formed by the coordinates defining the element.

2 Claims, 5 Drawing Sheets

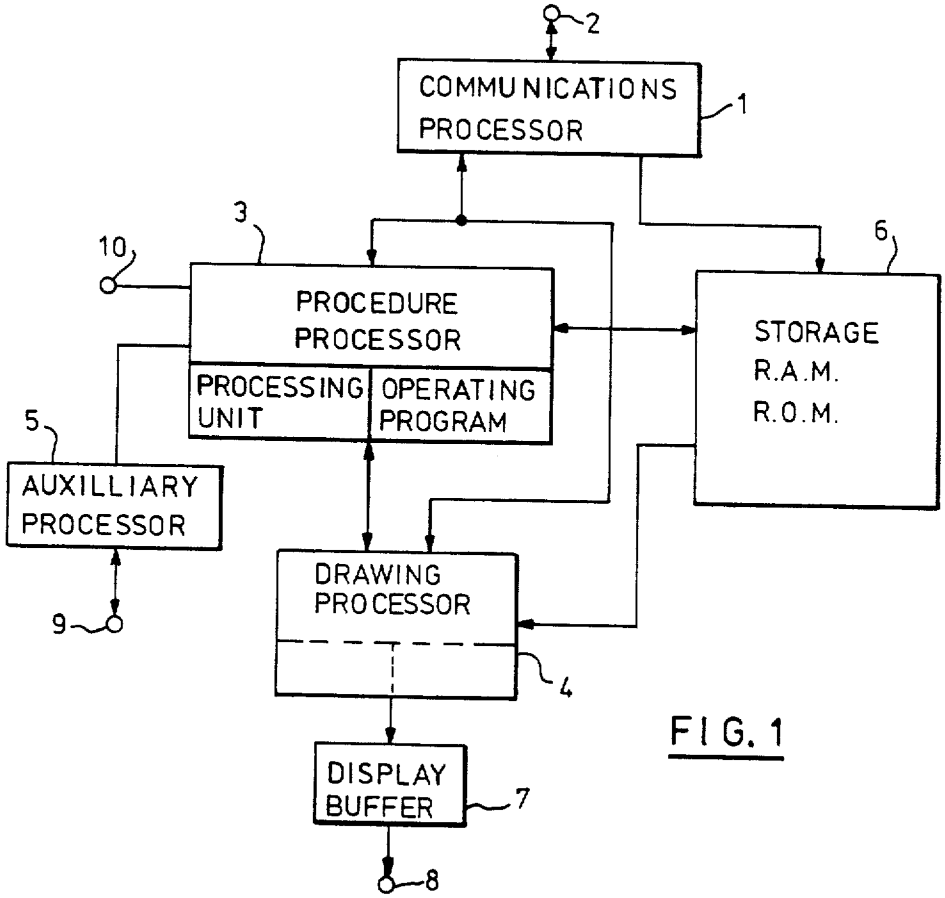
FIG. 1
FIG. 2
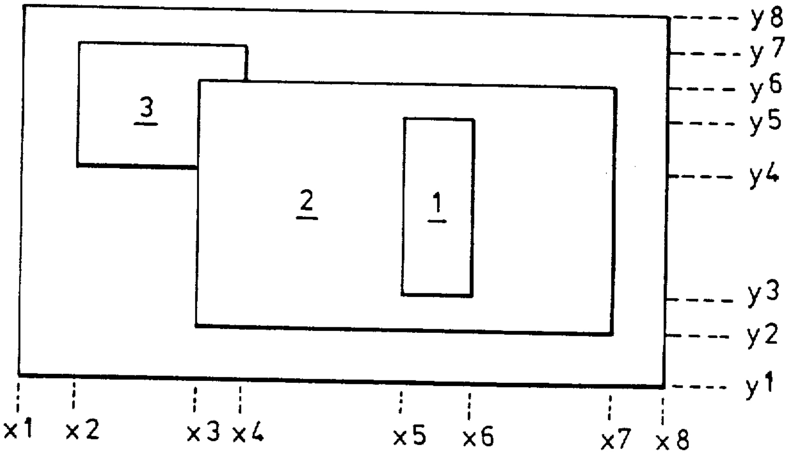

30 31

| | | | | | | | | |
|---|---|---|---|---|---|---|---|---|
| 000 | 040 | 067 | 103 | 267 | 346 | 517 | 616 | 720 |

| | | | | | | | | | |
|---|---|---|---|---|---|---|---|---|---|
| | 512 | | | | | | | | |
| 7 | 488 | 7 | 7 | 5 | 7 | 7 | 3 | 3 | 3 |
| 6 | 467 | 7 | 7 | 5 | 7 | 7 | 3 | 3 | 3 |
| 5 | 360 | 6 | 6 | 5 | 1 | 1 | 1 | 7 | 7 |
| 4 | 232 | 6 | 4 | 4 | 1 | 1 | 1 | 4 | 7 |
| 3 | 147 | 6 | 4 | 4 | 1 | 1 | 1 | 2 | 2 |
| 2 | 011 | 6 | 6 | 5 | 6 | 2 | 2 | 2 | 2 |
| 1 | 004 | 7 | 7 | 5 | 7 | 2 | 2 | 2 | 2 |
| 0 | 000 | 7 | 7 | 7 | 7 | 7 | 7 | 7 | 7 |

FIG. 3

| | | | | | | | | |
|---|---|---|---|---|---|---|---|---|
| 000 | 040 | 067 | 103 | 267 | 346 | 517 | 616 | 720 |

| | | | | | | | | |
|---|---|---|---|---|---|---|---|---|
| 512 | | | | | | | | |
| 488 | 0 | 0 | 0 | 0 | 0 | 0 | 0 | 0 |
| 467 | 0 | 0 | 0 | 0 | 0 | 0 | 0 | 0 |
| 360 | 0 | 0 | 0 | 1 | 1 | 1 | 0 | 0 |
| 232 | 0 | 0 | 0 | 1 | 1 | 1 | 0 | 0 |
| 147 | 0 | 0 | 0 | 1 | 1 | 1 | 0 | 0 |
| 011 | 0 | 0 | 0 | 0 | 0 | 0 | 0 | 0 |
| 004 | 0 | 0 | 0 | 0 | 0 | 0 | 0 | 0 |
| 000 | 0 | 0 | 0 | 0 | 0 | 0 | 0 | 0 |

FIG. 4

| | | | | | | | | |
|---|---|---|---|---|---|---|---|---|
| 000 | 040 | 067 | 103 | 267 | 346 | 517 | 616 | 720 |

| | | | | | | | | |
|---|---|---|---|---|---|---|---|---|
| 512 | | | | | | | | |
| 488 | 1 | 1 | 0 | 1 | 1 | 0 | 0 | 0 |
| 467 | 1 | 1 | 0 | 1 | 1 | 0 | 0 | 0 |
| 360 | 0 | 0 | 0 | 0 | 0 | 0 | 1 | 1 |
| 232 | 0 | 0 | 0 | 0 | 0 | 0 | 0 | 1 |
| 147 | 0 | 0 | 0 | 0 | 0 | 0 | 0 | 0 |
| 011 | 0 | 0 | 0 | 0 | 0 | 0 | 0 | 0 |
| 004 | 1 | 1 | 0 | 1 | 0 | 0 | 0 | 0 |
| 000 | 1 | 1 | 1 | 1 | 1 | 1 | 1 | 1 |

FIG. 5

DATA DISPLAY FOR CONCURRENT TASK PROCESSING SYSTEMS

BACKGROUND OF THE INVENTION

1. Field of the Invention

This invention relates to data display systems and in particular to such systems that can display data relating to more than one task at a time, and are connected to or include a data processing device which can be used for the concurrent processing of different tasks.

2. Prior Art

Viewporting is the generic name given to the technique of defining a particular screen area as the viewport to which an application task writes and displays data—graphic and alphanumeric. When a user is using a display terminal to interact with more than one application task, or program, then different areas of the screen will be allocated to different applications, this is called multiple viewporting. This concept is explained in "Fundamentals of Interactive Computer Graphics" by Foley and Van Dam, published by Addison Wesley 1982.

A further development has been the so-called "messy desk" concept in which multiple viewports overlap and the user regards the viewport which overlays all the others as that which has the highest priority and the one that is currently being used.

Viewporting designs for current raster displays use the concept that only the viewport that has the highest priority, i.e. on top of, or overlaying all others, can have its display modified. This, in effect, corresponds to a single application situation and requires the complete re-drawing of a viewport whenever it is promoted to the highest priority after it has been overlaid.

An example of such a technique is described in European Patent Application No. 083301868.2. (U.S. Pat. No. 4,642,790). In that application is described a multiviewport system in which the writing of application data into overlapping viewports is controlled by a screen manager. The screen manager maintains a series of priority flags for each pixel (bit in the screen buffer) relating to the layers of the viewports, and a viewport order list. Only the current, that is highest priority viewport is written into by an application. There is no provision for having more than one application writing into a lower priority viewport overlapped by the current viewport other than serially, that is writing to one viewport is completed before processing the next one.

An advance on the above technique is described in European patent application No. 83307697.9 (U.S. application No. 674,799 filed 11/26/84) in which is described a technique for writing into the visible space of overlaid viewports while the user is currently interacting with a higher priority viewport. An extra bit plane is used as a mask buffer and when an application task has new data to display in an associated viewport the mask is set to inhibit writing into areas of the display screen that are covered by higher priority viewports.

The disadvantage of using the extra bit plane as a mask buffer is the requirement for the extra circuitry in the display apparatus.

The clipping of lines against a simple rectangular boundary is well understood, (see Fundamentals of Interactive Computer Graphics, quoted above). However the clipping becomes more complex in the case in which a number of upright rectangular graphics pictures which overlap each other are to be displayed on the screen. The overlapping may be quite arbitrary and any one region may have more than one (disjoint) region of visibility. There may also be embedded obscured regions and also the clipping boundaries may not be simple rectangles.

The problem to be solved is to provide a display apparatus that when it is operating with multiple viewports it has the capability to determine the parts of a graphic line primitive to be displayed on the screen for lower priority, overlapped viewports.

One solution to the problem is to provide a control system for a display apparatus that controls the processors to divide the visible part of each picture into rectangles, each one of which is completely visible. In order to draw one picture, its display list must be processed once for each such rectangle, clipping to the rectangle's boundary. The solution has the following disadvantages:

a. A single, apparently continuous, line might cross a boundary between adjacent rectangles, and therefore be drawn in stages (with many other primitives being drawn in between). Care must be exercised to ensure that the operator does not notice any discontinuity at this boundary. In particular:
   (1) There may be a slight kink in the line, if the full line's parameters have not been used for the Bresenham algorithm coefficients. To overcome this problem, the true endpoints of the line need to be remembered even after the line has been clipped, this causes further processing and lengthens the drawing period.
   (2) If the line is not solid (i.e. it is dashed, dotted, etc.) some way must be found of getting the correct starting point in the line-type definition at the start of each stage.
b. The display list has to be processed from a high level once for each rectangle. In particular, transformations are performed once for each rectangle, rather than once for the whole picture, as in the method of the current invention described below, so the performance is likely to be inferior.
c. Unless the drawing engine is extremely fast, the operator will notice the picture being split up into these rectangles. The human factors of this are probably inferior to those of the method described, where there is no such split.

The solution of the problem described in the present application includes the provision of a method of operating a data display device and the provision of a data display system configured to operate the method.

SUMMARY OF THE INVENTION

According to one aspect of the invention there is provided a method for automatically changing the display in overlapping rectangular viewport areas of a display screen of a digital display apparatus without direct operator control and in which each viewport area is assigned a different priority level, comprising the steps of:

(a) storing in a random access store indications of the position and size of each viewport area, together with an indication of the priority level of the viewport area, (b) constructing a master matrix of $(2n+1)^2$ elements, where n is equal to the number of viewport areas, by assigning a vertical component to each vertical coordinate of each viewport area and a horizontal component to each horizontal coordinate of each viewport area, and for each element so formed storing an indication of the highest priority level of the viewports covered by the element, (c) receiving an indication that the display of a particular viewport is to be changed, (d) constructing a condensed matrix for the viewport area, the display of which is to be changed, by storing, for each element, an indication whether or not it covers the particular viewport that is to be changed, and associating the corresponding elements of identical rows and columns together, (e) receiving indications of the coordinate values of the display to be displayed in the viewport area, (f) using the second matrix to determine the coordinates of the received display information that can be displayed in the viewport area, and (g) storing the indications of the coordinate values in the random access store.

According to a second aspect of the invention there is provided a data display apparatus comprising a procedure processor, a storage unit and a display buffer operating under the control of a control system to display on a display screen multiple overlaid viewports, each assigned to a different application task, characterised in that the operating system includes:

communication means, adapted to control the apparatus to receive data display information signals from an application processor, and processor means, adapted to control the procedure processor to store in a random access store indications of the position and size of each viewport area, together with an indication of the priority level of the viewport area, and to generate signals indicating the result of constructing a first matrix of $(2n+1)^2$ elements, where n is equal to the number of viewport areas, by assigning a vertical component to each vertical coordinate of each viewport area and a horizontal component to each horizontal coordinate of each viewport area, and for each element so formed storing an indication of the highest priority level of the viewports covered by the element; to construct a second matrix for the viewport area, the display of which is to be changed, by storing, for each element, an indication whether or not it covers the particular viewport that is to be changed, and associating the corresponding elements of identical rows and columns together, and using the second matrix to determine the coordinates of the received display information that can be displayed in the viewport area and to generate and store signals indicative of the determination.

BRIEF DESCRIPTION OF THE DRAWINGS

In order that the invention may be fully understood preferred embodiments thereof will now be described with reference to the accompanying drawings in which:

FIG. 1 is a block schematic diagram of a preferred embodiment of display apparatus suitable for carrying out the invention.

FIG. 2 illustrates the layout of a display screen having multi-overlaid viewport areas.

FIGS. 3 to 9 illustrate steps in the preferred embodiment of the method for implementing line clipping aspect of the invention.

DESCRIPTION OF PREFERRED EMBODIMENTS OF THE INVENTION

Figure 6:
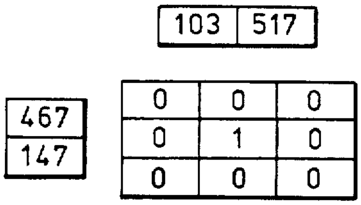

Referring now more particularly to FIG. 1 there is shown a block schematic of a display apparatus comprising a communications processor 1 connected to an input/output port 2 through which the apparatus transmits and receives information signals to and from a remote data processing machine. The apparatus includes three other processors, a procedure processor 3, a drawing processor 4 and an auxiliary processor 5. A storage unit 6 contains both random access and read only memory portions and a display buffer 7 is connected to an output port 8 which directly communicates control signals to a display screen (a raster driven cathode ray tube).

The communications processor 1 performs the functions necessary to transmit and receive data from the remote data processing machine. Data received is routed to the appropriate storage location in the storage unit 6.

The procedure processor 3 performs the functions of (a) controlling the sequencing of the data display apparatus, (b) controlling the input devices, such as keyboard, optical mouse, tablet etc., through input ports 10, (c) modifications of the standard picture segments stored in the storage unit required by a particular display picture, (d) controlling of the invocation of the other processors, (e) controlling the transmission of data through the communications processor to the remote processor, and, of particular interest to the preferred embodiment of the present invention, (f) controlling the apparatus to perform the function of clipping line segments to the visible portions of overlaid viewports.

The drawing processor 4 performs the function of transforming the information signals passed to it from the procedure processor 3 indicating line coordinate end and start points into on/off pixel information signals and transferring these signals to the display buffer 7 where they are used to control the display device.

The auxiliary processor 5 controls the functions associated with any auxiliary device attached to the display apparatus. For example a locally attached personal computer could be attached through port 9 to the auxiliary processor.

The control of the processors to perform their particular functions is in the form of microcode stored in the processors own local storage unit or in the main storage unit 6. Modifications to the operation of the processors are made by the use of further code held in the random access portion of the storage unit 6. The tasks that are assigned to a particular processor are a matter of design choice and it is envisaged that the functions of two or more of the processors may be combined into a single processing unit. It could be that the clipping and viewporting tasks are performed by the drawing processor rather than the procedure processor.

The embodiment of the invention will now be described in general terms with reference to FIG. 2 in which there is shown in schematic form a layout of a screen with three concurrent overlapping viewport areas, and the boundaries of a first matrix (later identified as a condensed visibility matrix CVM) the coordinates of which are constructed by the procedure processor and coordinate indicative signals stored on an appropriate storage location.

In this example the display apparatus is considered to be operting under three applications, each of which is allocated a viewport area on the display screen. Viewport 1 has the highest priority and overlays viewport 2 which in turn overlays viewport 3. The coordinate values of the first matrix are determined from the x and y components of the coordinates of the boundaries of the three viewports, and the boundaries of the screen area in which the viewports are displayed. Thus the first matrix coordinates in this example are derived as follows:

Verticals, $x_1y_1/x_1y_8$ from display area boundary,
$x_2y_1/x_2y_8$ from viewport 3 left vertical boundary,
$x_3y_1/x_3y_8$ from viewport 2 left vertical boundary,
$x_4y_1/x_4y_8$ from viewport 3 right vertical boundary,
$x_5y_1/x_5y_8$ from viewport 1 left vertical boundary,
$x_6y_1/x_6y_8$ from viewport 1 right vertical boundary,
$x_7y_1/x_7y_8$ from viewport 2 right vertical boundary,
$x_8y_1/x_8y_8$ from display area boundary, Horizontals, $x_1y_1/x_8y_1$ from display area boundary,
$x_1y_2/x_8y_2$ from viewport 2 bottom boundary,
$x_1y_3/x_8y_3$ from viewport 1 bottom boundary,
$x_1y_4/x_8y_4$ from viewport 3 bottom boundary,
$x_1y_5/x_8y_5$ from viewport 1 top boundary,
$x_1y_6/x_8y_6$ from viewport 2 top boundary,
$x_1y_7/x_8y_7$ from viewport 3 top boundary,
$x_1y_8/x_8y_8$ from display area boundary, The matrix shows which picture is visible at each point of the screen, but it does not have to be as large as the number of points (or character cells, if the pictures are constrained to character cell boundaries) on the screen; it is only large enough to indicate the topology of the screen layout. The first matrix therefore need to include only $(2n+1)^2$ elements, where n is the number of viewport areas.

Each element of the matrix is stored together with a pointer to the viewport area covering the element having the highest priority. For example, if the screen is laid out as in FIG. 2 then the pointers in the first matrix will be as follows, where 0 is used to indicate unoccupied screen regions:

| |
|---|
| 0000000 |
| 0330000 |
| 0322220 |
| 0322120 |
| 0022120 |
| 0022220 |
| 0000000 |

The x/y values of each of the row/column boundaries are also stored.

The first matrix is built by scanning the lists of viewport rectangles and sorting the coordinates, taking into account viewport priority.

When a given picture is being processed, it has been found advantageous to have as small a matrix as possible. It is assumed that the primitives i.e. lines, arcs etc., have already been clipped to the viewport area and that they never extend outside the area to which they are allocated on the screen, therefore it is not necessary to be concerned with regions outside the viewport area. Rows and/or columns the function of which is to reflect boundaries outside the viewport area may therefore be eliminated. Thus the matrix required during the processing of a picture to be displayed in viewport 2 is:

| |
|---|
| 2222 |
| 2232 |
| 2232 |
| 2222 |

It is now possible to create larger areas in the matrix by combining adjacent columns and rows that are identical. Thus column 1 and column 2 may be combined and row 2 and row 3 combined to give:

| | | |
|---|---|---|
| I | I | I |
| I | O | I |
| I | I | I |

where 2 has now been replaced by I, and any obscuring regions are identified by 0 (only viewport 1 obscures in this case, but, even if there is more than one obscuring viewport, it serves no purpose to identify them individually). As with the first matrix the x/y co-ordinates of each column/row boundary can be stored, or pointers to the boundaries of the enlarged elements can be stored in x and y lists doing away with the need to maintain in store the actual reduced matrixes for all of the viewports. This second or reduced version of the matrix is used for clipping the primitives to the visible regions of the viewport area.

In the following, the term "region" will be used to refer to an area of the picture represented by a single element in the second matrix.

Line clipping is carried out by the following procedure:

First the region or regions containing the start and end points of each primitive have to be identified. In a polyline the start point region is stored as the end point region of the previous line. If the start and end points are in the same region, the line can immediately be identified either as being required in its entirety, or as being completely rejected. If this is not the case then;

1. If the starting and ending regions are either in the same row, or in the same column, of the second matrix, the regions through which the line passes can immediately be identified. An output line is generated for each group of consecutive "I" elements. This is straight-forward for horizontal and vertical lines, otherwise, if there is a mix of visible and obscured regions the points at which lines intersect boundaries have to be calculated.

2. Otherwise proceed as follows;

(a) Using either the starting and ending regions, or the starting and ending x and y values, the quadrant in which the line is travelling is identified.

(b) Calculate on which side of the appropriate corner of the current region the line will pass, and hence which region it actually next enters. Note it could actually move into the next diagonal region, if it passes exactly through the corner.

(c) Continue the process until the line reaches the ending region, generating output lines for each uninterrupted portion of the line. In order to minimise the number of "corner" calculations each new region is checked, as it is entered, to determine whether that region is in the same row or column as the ending region.

Note that before drawing the picture, the first matrix is inspected to determine whether the picture to be drawn is completely visible. If it is then drawing should proceed normally without entering into the above procedure. If none of the picture is visible, i.e. the viewport area is completely overlaid then there is no further action taken.

There now follows a more detailed description of an embodiment of the invention in which the sequence of control of the display apparatus is described in terms of a high level program language.

The translation of the program language into the actual physical control of the apparatus may either be by the conventional, compiler to machine code to circuit control route, or it may be designed into a programmable logic array, (PLA) using the compiler to circuit design tool route now common in the art. The actual method of implementing the control function in the apparatus is a design choice and depends upon factors not strictly relevant to the function itself. For example in display apparatus designed to be used for more than one type of application it may be convenient to have the control functions held in the form of software, i.e. easily changeable. Where "software" is defined as; the changeable control of the hardware. Or in a display apparatus which is dedicated to a particular task it would probably be more efficient to have the control function embodied in a permanent circuit such as a PLA or an EEPROM.

Control functions used to clip primitives to a generalised non-rectangular (and possibly fragmented) viewport have to handle the following "primitives":

1. Image rows
2. Normal Lines
3. Lines encountered in an area boundary definition
4. Rectangles (e.g. characters or "screen clear" orders)

VIEWPORT DEFINITION—CONDENSED VISIBILITY MATRICES

The configuration of logical terminal viewports on the real screen at any given time is defined by a condensed visibility matrix (CVM). If 8 viewports are supported the CVM consists of a 17×17 matrix of one byte entries and two 18 element vectors of 2-byte (fixed 16) entries. To save space in the examples that follow, however, the matrix will be simplified and shown as 8×8. A typical CVM might be as shown in FIG. 3. The two vectors (30, 31) serve to define rectangular cells on the screen, the corresponding entry in the matrix showing for each cell the identification (ID) of the logical terminal (LT) uppermost (visible) in that cell.

This in this example LT5 occupies the rectangles $67 <= x < 103,\ 4 <= y < 11$ $67 <= x < 103,\ 11 <= y < 147$ $67 <= x < 103,\ 360 <= y < 467$ $67 <= x < 103,\ 467 <= y < 488$ $67 <= x < 103,\ 488 <= y < 512$ while LT4 occupies $40 <= x < 67,\ 147 <= y < 232$ $40 <= x < 67,\ 232 <= y < 360$ $67 <= x < 103,\ 147 <= y < 232$ $67 <= x < 103,\ 232 <= y < 360$ $517 <= x < 616,\ 232 <= y < 360$ Note: An entry of 0 (not shown in FIG. 3) indicates that a part of the screen is not occupied by any LT.

REDUCED VISIBILITY MATRICES

Figure 7:
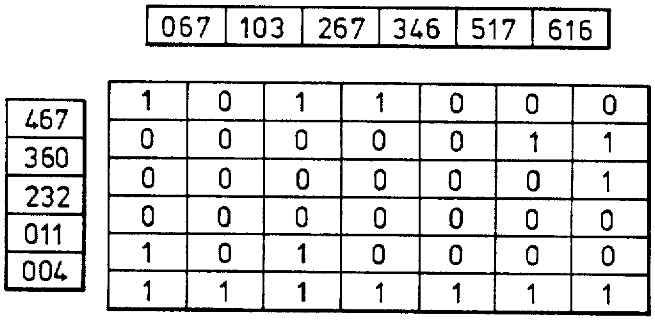

The CVM defines the layout of LT's over the entire screen and in general will contain more information than is needed when clipping primitives on behalf of a given LT. Once a 'current LT' has been selected the matrix may be refined to a more useful format. Conceptually the process is as follows:

1. Replace entries for the LT of interest by 1's and replace all other entries by 0's. For LT1 in this example the matrix is then as shown in FIG. 4. For LT7 the matrix is as shown in FIG. 5.
2. The next stage is to eliminate any row or column identical to its neighbour (along with the corresponding vector elements). The matrix so produced is termed a Reduced Visibility Matrix (RVM). The RVM for LT1 is shown in FIG. 6 and for LT7 is shown in FIG. 7.

IMPLEMENTATION—REDUCED COORDINATES

A possible implementation would follow the path just discussed and maintain the appropriate RVM for each LT to be derived in the manner described above each time the CVM is changed.

Not only is this wasteful of space (each RVM could conceivably be as large as the CVM) but the reduction process is clumsy to implement in a one dimensional address space. A preferable approach is to maintain for each LT a pair of lists (of length at most 18) containing offsets into the x and y Condensed Visibility Vectors (CVVs) of the entries in the x and y Reduced Visibility Vectors (RVVs). These lists are padded to the right with zero.

Figure 8:
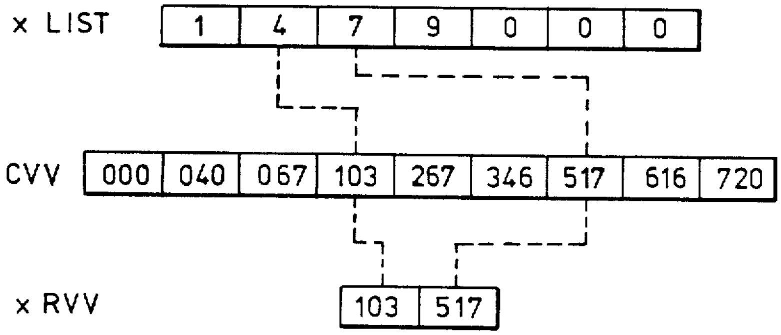
Figure 9:
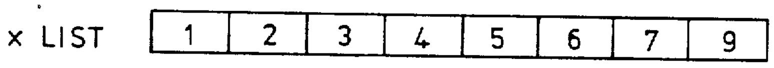

To return to the example above LT1 would give rise to an x list as shown in FIG. 8. LT7 xlist would be as shown in FIG. 9.

It is helpful to think of three coordinate spaces. In order of increasing granularity these are as follows:

- Real pels—for example the point (622,191)
- Condensed coordinates—Coordinates of the relevant CVM cell—in our example above we see that the point (622,191) lies in the cell (7,3)
- Reduced coordinates—Coordinates of the RVM cell for the particular LT—in this case
  - (2,1) for LT1
  - (6,2) for LT7

It can be seen that an LTs x and y lists permit translation between all three sets of coordinate systems. In particular the following functions:

- rc: pel coordinate pair→reduced coordinate pair
- rb: reduced x coordinate→pel x coordinate of right boundary
- lb: reduced x coordinate→pel x coordinate of left boundary
- tb: reduced y coordinate→pel y coordinate of upper boundary
- bb: reduced y coordinate→pel y coordinate of lower boundary
- vis: reduced coordinate pair→TRUE if current LT visible at point, FALSE otherwise

GENERATING THE X AND Y LISTS

The control function to build x and y lists is described below. Use is made of a comparator row, and an array of entries corresponding to a CVM row.

The y list values are generated sequentially and may simply be appended to the current y list.

The x list entries can appear in any order. The function insert maintains the x list entries in increasing order only adding a value to the list if it does not already occur.

Initialise x list first entry 1+CVM width
Initialise comparator row to zeroes

```
do for each CVM row
    Reset row-different flag
    do for each entry in CVM row
        if CVM entry = LT id then
            Write 1 to comparator row slot
        else
            Write 2 to comparator row slot
        if comparator entry changed then
            Set row-different flag
        if comp. entry <or> its leftmost neighbour then
            Insert column number into x list
    end
  if row-different flag set then
    Append row number to y list
end
```

IMAGE ROW CONTROL FUNCTION

The image row is specified by a pel coordinate starting point (XPEL, YPEL) and a length in pels (LENG). The function may be expressed as follows:

```
(XR,YR)       := rc(XPEL,YPEL)
X             := XPEL
VISIB         := vis(XR,YR)
LENG2         := 0
  do while LENG <or> 0
    if rb(XR) - X >= LENG then
      do
        if VISIB then
          write LENG2+LENG bits of image (from current position)
        return
      end
    LENG2 := LENG2 + rb(XR) - X       number of bits to be drawn/
                                      skipped
    LENG := LENG - rb(XR) + X         number of bits left
    X := rb(XR)                       new boundary
    XR := XR + 1
    if VISIB <or> vis(XR,YR) then
      do
        if vis(XR,YR) then
          move to (lb(XR),YPEL)
        else
          write LENG2 bits of image
        LENG2 := 0                    reset number to be drawn
        VISIB := vis(XR,YR)
      end
  end
```

NORMAL LINES CONTROL FUNCTION

The line is specified by pel coordinate starting and stopping points (XSTART, YSTART) and (XSTOP, YSTOP).

The function takes slightly differing forms for the four quadrants in which the line can travel. We consider here only the first quadrant, that is only the case when XSTOP>XSTART and YSTOP>YSTART.

```
DELTAX := XSTOP - XSTART
DELTAY := YSTOP - YSTART
(XPEL,YPEL):= (XSTART,YSTART)
(XR,YR):= rc(XSTART,YSTART)
VISIB := vis(XR,YR)
move to (XSTART,YSTART)
  do while(XR,YR) <or> rc(XSTOP,YSTOP)
    ERROR := DELTAY*(rb(XR)-XSTART) -
        DELTAX*(tb(YR)-YSTART)
    select
      when ERROR < 0             sideways move
        do
          XR := XR + 1
          if VISIB = vis(XR,YR) then iterate
          XPEL := lb(XR)
          YPEL := tb(YR) + ERROR/DELTAX
        end
      when ERROR > 0             upwards move
        do
          YR := YR + 1
          if VISIB = vis(XR,YR) then iterate
          XPEL := rb(XR) - ERROR/DELTAY
          YPEL := bb(YR)
        end
      OtherWise                  diagonal move
        do
          XR := XR + 1
          YR := YR + 1
          if VISIB = vis(XR,YR) then iterate
          XPEL := lb(XR)
          YPEL := bb(YR)
        end
      end
      if vis (XR,YR) then move to (XPEL,YPEL)
        else draw a line to (XPEL,YPEL)
      VISIB := vis(XR,YR)
    end
  if vis(XR,YR) then draw a line to (XSTOP,YSTOP)
  else move to (XSTOP,YSTOP)
```

The remaining three quadrants are treated in a similar manner.

AREA CONTROL FUNCTION

The method for clipping an area primitive belonging to a picture that may be overlapped, so that only those parts of the primitive (if any) which should be visible, are in fact drawn, will now be described in general followed by the specific embodiment. It is assumed that the area is defined by means of a number of boundary lines, though a similar technique could be used if the boundaries were defined as arcs, etc.

It is assumed that areas are being drawn by a technique in which the boundary lines are drawn, in exclusive-OR mode, in a spare bit plane. (Certain other rules are necessary, which will not be described in detail here; for example, any one boundary line may only cause one display point to be written per raster line, and the top, but not the bottom, display point of each boundary line is written.) When the area boundary definition is complete, the interior is constructed in the visible bit planes, by scanning each raster line (within the spare bit plane) in turn, from left to right; each 'on' pel found flips the state between interior and exterior. The boundary lines in the spare bit plane can then be discarded.

The problem with area primitives therefore is to modify the outline of the boundary, as drawn in the spare bit plane, so that when the scan is performed to construct the interior, only those parts of the area interior which should be visible, with the current screen layout, will in fact be drawn. (It is assumed that it is inconvenient, for various reasons, for this latter process to restrict itself to the visible regions.)

Figure 10:
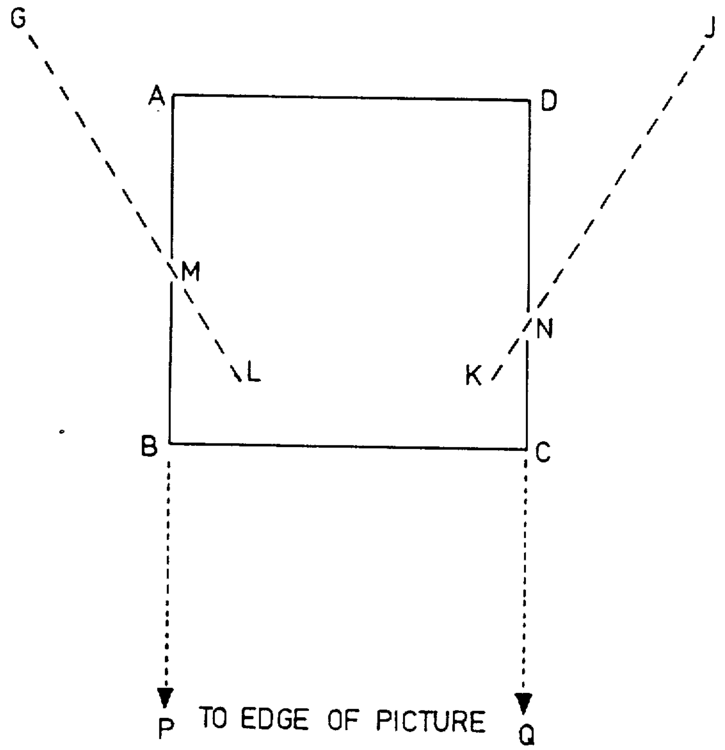
FIGS. 10, 11*a*, 11*b*, and 12 illustrate steps in the preferred embodiment of the method for implementing the area clipping aspect of the invention.

Consider FIG. 10, which shows a single obscuring region ABCD. Two boundary lines, GL and KJ, intersect this region, at M and N respectively. In fact, these lines could be part of either of the two areas shown in FIG. 11, but, in general, at the time GL and KJ are received, it will not be known which. In case (a), the figure GHIJNCBM is eventually to be drawn, and in case (b), the figure GMADNJ.

Now the boundaries ML, LK, and KN must never be drawn, since the area state must never change either to or from 'interior' inside the obscuring rectangle ABCD.

The remainder of the area boundaries will be drawn, but this will be insufficient to produce the required effect around ABCD. In case (a), we clearly need the additional boundary MBCN, and in case (b), an additional MADN. Since, with the area drawing algorithm being used, horizontal boundary lines have no effect, this means that we need additional lines MB and NC in case (a), and AM and DN in case (b).

The following scheme will achieve the required effect:

1. Whenever a boundary line intersects the side boundary of an obscuring region, the portion of the line outside the obscuring region is drawn, and an additional boundary line is drawn from the point of intersection to the top corner of the obscuring region, e.g. AM for line GL. (The choice of the top corner is arbitrary; rule 2 would have to be modified if the bottom corner were chosen instead.)
2. One bit is defined for each vertical side of each obscuring region. These bits are cleared whenever an area boundary definition is started. Whenever a boundary line passes across the projection downwards of a vertical side of an obscuring region to the bottom of the picture, the corresponding bit is flipped.

Figure 11:
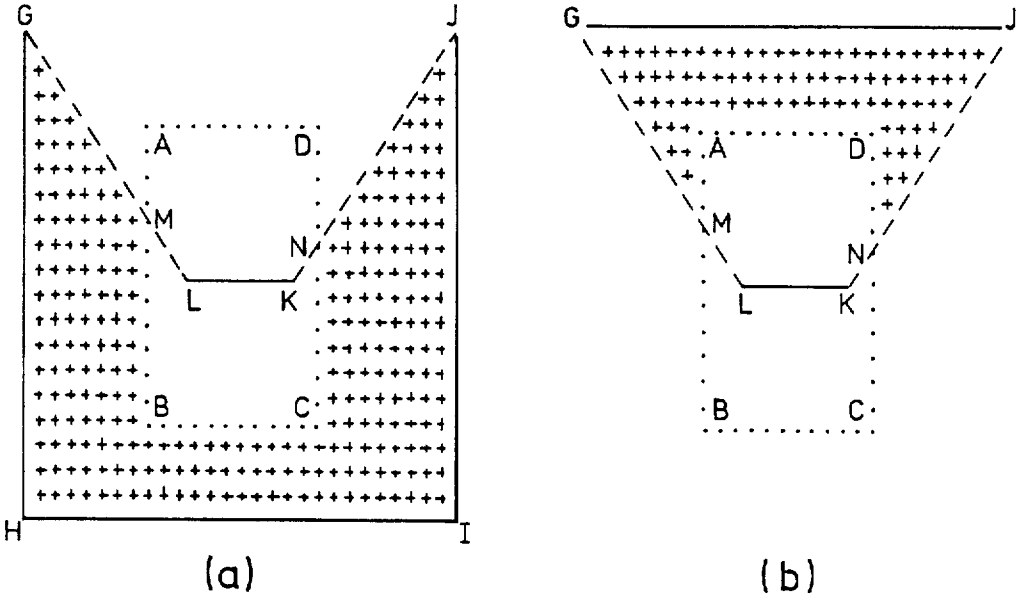

Thus, in FIG. 11, the line HI will cause the bit associated with AB to be flipped, and also the bit associated with DC to be flipped. (But, since it is only lines crossing the projection beneath the cell, i.e. crossing BP or CQ (in FIG. 10), which have this effect, GL and KJ do not affect these bits.)

When the area boundary definition is complete, any of these projections which have had an odd number of boundary lines crossing them will have their bits set. For each such case, an additional boundary line is then drawn along the corresponding vertical side. Since all boundary lines are drawn in exclusive-OR mode, this will have the effect of reversing the bits along that vertical side.

In the example given, AM and DN will have been drawn in both cases (a) and (b). However, in case (a), the boundary line HI will have caused both bits to have been set, so at the termination of the boundary definition, AB and DC will be drawn. In case (a), therefore, the net effect will be the desired one of MB and NC being set.

Thus, while an area boundary is being defined, a check must be made, whenever a vertical region boundary is crossed, whether there are any obscuring regions above, either to the left or to the right. If so, their bit(s) must be flipped.

Clearly this can never occur with obscuring regions which are on the lowest row of the matrix.

If there is a number of adajcent obscuring regions along a row of the reduced layout matrix, the technique described will still work.

Note that it may be a simpler implementation to keep one bit for each vertical boundary between matrix regions, and to flip these bits each time a boundary line crosses that boundary. When the boundary definition is complete, each vertical side of each obscuring region is examined: the bits corresponding to the boundaries vertically below it are exclusive-ORed together, to determine whether or not an additional line should be written along that vertical side. (Regions in the bottom row need not be processed; similarly, bits need not be kept for boundaries between regions in the top row of the matrix.)

A detailed implementation of the area clipping embodiment follows.

LINES IN AREA DEFINITION CONTROL FUNCTION

This function assumes that area fill is implemented by drawing the boundary lines in Exclusive-OR mode into an area fill region the same size as the screen, scanning the region from left to right at End Area time. Additional vertical lines must also be written to ensure that the filled area starts, where required, at the left hand side of a viewport segment and stops at the right hand side.

The following function causes these lines to be drawn, making use of the fact that all lines directed to the area fill region are drawn in Exclusive-OR mode.

Let the dimensions of the RVM be $m*n$ ($m,n<16$). This matrix clearly contains $(m-1)*n$ internal vertical boundaries between regions. Define an array of "Area fill bits" in one-to-one correspondence with these boundaries. For convenience these bits may be grouped as the m-1 leftmost bits of n 16-bit words in such a way that each word corresponds to a horizontal boundary. The leftmost bits are assigned to boundaries in the leftmost column (column 0), the next bits to column 1 and so on.

Each such 16-bit word may be associated with the RVM row in which its boundaries lie. Associate a mask with each column of the RVM in the following manner:

| | |
|---|---|
| Column 0 (left) | '1111111111111111'b |
| Column 1 | '0111111111111111'b |
| Column 2 | '0011111111111111'b |
| Column 3 | '0001111111111111'b |
| . . . | |

Set all the area fill bits to zero when a Begin Area is encountered.

Process lines as described in the previous section but also

1. Every time a vertical boundary between a visible and an invisible region is encountered draw an additional line vertically upwards until the top of the current RVM row is reached.
2. Every time any horizontal boundary is crossed (irrespective of visibility) Exclusive-OR the Mask associated with the current RVM column with the set of area processing bits associated with the RVM row above the horizontal boundary.

At End Area time draw all vertical boundaries whose area processing bits are set, and which lie between visible and invisible regions.

RECTANGLE SUBDIVISION CONTROL FUNCTION

Figure 12:
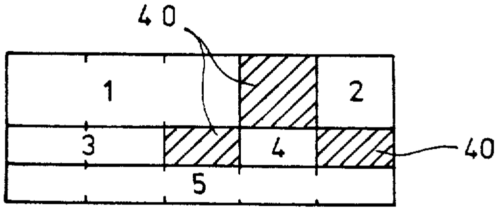

FIG. 12 shows a series of viewport areas 1, 2, 3, 4, 5 in the order of their generation. The areas 40 are obscuring regions.

This function takes a rectangle specified by the pel coordinates (TLX,TLY) of its top left and (BRX,BRY) of its bottom right corners and splits it into a set of rectangles exactly covering the unobscured portions of the interior of the rectangle. It is used for clipping rectangular image characters and for handling requests to clear the entire viewport.

The rectangles are generated by scanning from left to right along each RVM row. A visible rectangle is found and then pieced together with any neighbours on its row. No attempt is made to piece together the rectangle with visible neighbours in adajcent RVM rows. All rectangles produced are therefore one RVM row deep, although they may span several RVM columns.

The algorithm takes the form of a co-routine with its own static data. Successive calls to the routine return successive rectangles until the input rectangle has been completely covered.

Note: Both the input and the output rectangles are defined as including all their boundaries.

```
Variables (static) :
        (X1,Y1)  pel coordinates of top left of rectangle being
                 considered
        (X2,Y2)  pel coordinates of bottom right of rectangle
being
                 considered
        (XR,YR)  reduced coordinates of rectangle being
considered
         XRLEFT  reduced x coordinate of leftmost rvm column in
large
                 rectangle
         X2LEFT  pel x coordinate of leftmost rvm boundary in
large
                 rectangle
  Initialisation:
if first call then
  do                                initialise static
                                    variables
    (X1,Y1) := (TLX,TLY)            pel coordinates of top
left
    (XR,YR) := rc(X1,Y1)            reduced coordinates
```

-continued

```
     XRLEFT := XR                   row wrap field
     X2LEFT := rb(XR)               row wrap field
     X2 := X1 - 1                   set to fictitious
rectangle to
                                    left of first
     Y2 := bb(YR)                   y value correct
     XR := XR - 1                   set to fictitious
rectangle to
                                    left of first
  end
  Scan (every row if necessary) looking for a visible
  rectangle:
do until vis(XR,YR)                 find next visible region
  if X2 >= BRX then                 if at right end of row
    do
      if Y2 <= BRY then
        return('No more rectangles')
      else
        do                          wrap to next row
          (X1,Y1) := (TLX,Y2+1)
          YR := YR - 1
          X2 := X2LEFT
          Y2 := bb(YR)
          XR := XRLEFT
        end
    end
  else
    do                              move on to next
                                    region on
the
                                    right
      XR := XR + 1
      Xl := X2 + 1
      X2 := rb(XR)
    end
end
  Scan remainder of row to extend this rectangle rightwards:
ELOOP:do forever                    extend rectangle
                                    downwards
        if X2 >= BRX then           if at right end of row
          do                        give up
            X2 := BRX
            leave ELOOP
          end
        if vis(XR+1,YR) then        if neighbour can be added
          do                        add it
            XR := XR + 1
            X2 := rb(XR)
          end
        else                        give up
          leave ELOOP
        end
    if Y2 < BRY then
      Y2 := BRY
  return rectangle (X1,Y1) → (X2,Y2)
```

SUMMARY

The application performs the viewport clipping as follows. During use with one or more application tasks, the apparatus of FIG. 1, through the procedure processor (3) stores indications of the coordinate addresses of each viewport area in the storage unit (6), together with an indication of the priority level of the viewport area.

When an application task being processed at a remote data processor or an auxiliary processor has information to display in its related viewport area, the processor communicates with the display apparatus through the communications processor 1, and the coordinates of the data display are stored in storage unit 6.

The display data may arrive from the remote processor already clipped to the viewport area or in an unclipped state. It is is unclipped then the procedure processor 3 performs first the normal clipping control functions (see UK patent application No. 8411579 (UK9-84-008)) and then proceeds to perform the method of clipping to the visible part of the viewport as described above.

The results of the procedure, signals indicating the clipped primitives to be displayed are then passed to the drawing processor 4 which constructs a raster pattern of signals to be transmitted to the display buffer 7. The signals stored in the display buffer are then used to update the display on the display screen.

The particular implementation of the control functions described above are not intended to limit the scope of the invention. Other implementations which depend upon particular characteristics of the display apparatus may, given the disclosure of the basic principals of the invention, be developed while still following those principals.

What is claimed is:

1. A method for automatically changing the display in overlapping rectangular viewport areas of a display screen of a digital display apparatus and in which each viewport area is assigned a different priority level, said method being exercisable without direct operator control and comprising the steps of:

(a) storing in a random access store indications of the position and size of each viewport area, together with an indication of the priority level of the viewport area, (b) constructing a master matrix of $(2n+1)^2$ elements, where n is equal to the number of viewport areas, by assigning a vertical component to each vertical coordinate of each viewport area and a horizontal component to each horizontal coordinate of each viewport area, and for each of said elements so formed storing an indication of the highest priority level of the viewports covered the said elements, (c) receiving an indication that the display of a particular viewport is to be changed, (d) constructing a condensed matrix for the viewport area, the display of which is to be changed, by storing, for each said element, an indication of whether or not it covers the particular viewport that is to be changed, and associating the corresponding elements of identical rows and columns together, (e) receiving indications of the coordinate values of the display to be displayed in the viewport area, (f) using said condensed matrix to determine the coordinates of the received display information that can be displayed in the viewport area, and (g) storing the indications of the coordinate values in the random access store.

2. Data display apparatus comprising a procedure processor, a storage unit and a display buffer operating under the control of a control system to display on a display screen multiple overlaid viewports, each assigned to a different application task, characterized in that said control system includes:

communication means, adapted to control the apparatus to receive data display information signals from an application processor, and processor means, adapted to control the procedure processor to store in a random access store indications of the position and size of each viewport area, together with an indication of the priority level of the viewport area and to generate signals indicating the result of constructing a first matrix of $(2n+1)^2$ elements, where n is equal to the number of viewport areas, by assigning a vertical component to each vertical coordinate of each viewport area and a horizontal component to each horizontal coordinate of each viewport area, and for each of said elements so formed storing an indication of the highest priority level of the viewports covered by said elements; to construct a second matrix for the viewport area, the display of which is to be changed, by storing, for each element, an indication whether or not it covers the particular viewport that is to be changed, and associating the corresponding elements of identical rows and columns together, and using said second matrix to determine the coordinates of the received display information that can be displayed in the viewport area and to generate and store signals indicative of the determination.

* * * * *